United States Patent [19]

Yokoi et al.

[11] Patent Number: 4,838,171
[45] Date of Patent: Jun. 13, 1989

[54] FRICTIONALLY DRIVEN ROLLER TYPE TRANSFER APPARATUS

[75] Inventors: Satoru Yokoi, Kawagoe; Toru Kai, Hanno, both of Japan

[73] Assignee: Tsubakimoto Chain Co., Osaka, Japan

[21] Appl. No.: 167,788

[22] Filed: Mar. 14, 1988

[30] Foreign Application Priority Data

Mar. 13, 1987 [JP] Japan ............................... 62-35989[U]
Mar. 13, 1987 [JP] Japan ............................... 62-35990[U]
Aug. 8, 1987 [JP] Japan ............................. 62-120986[U]

[51] Int. Cl.$^4$ ............................................. B61B 13/12
[52] U.S. Cl. ....................................... 104/166; 104/165
[58] Field of Search ............... 104/165, 166, 168, 35, 104/36, 37, 38, 49, 50, 249, 250, 251, 252

[56] References Cited

U.S. PATENT DOCUMENTS

| | | | |
|---|---|---|---|
| 4,532,869 | 8/1985 | Kondo et al. ..................... | 104/166 |
| 4,583,462 | 4/1986 | Hale .................................. | 104/166 |
| 4,646,649 | 3/1987 | Thatcher et al. ................. | 104/166 |
| 4,691,641 | 9/1987 | Rohrbach et al. ................ | 104/166 |
| 4,718,350 | 1/1988 | Jacoby et al. .................... | 104/166 |

FOREIGN PATENT DOCUMENTS

81562 5/1985 Japan .

Primary Examiner—Sherman D. Basinger
Assistant Examiner—Stephen P. Avila
Attorney, Agent, or Firm—Dann, Dorfman, Herrell and Skillman

[57] ABSTRACT

In a transfer apparatus in which a pallet is stationary when the crossing angle between the axes of rotation of a driven roller and a driving shaft is zero, and the pallet may be driven when the angle is greater than zero, a stop-start apparatus comprising a cam follower roller supported by a support member of said driven roller, a stopper block guided and supported at a stop position of the pallet so as to move to and fro in the directions of the transfer and having a notch into which said cam follower roller fits so as to keep said angle zero, a cam the proximal end of which is pivotally supported at a forward position of said stop position having a cam surface on which said cam follower roller makes a rolling contact, a spring urging said cam to a predetermined position, the distal end of said cam, in said predetermined position, being near said notch and said cam being so shaped as to increase said angle from zero to 45 degrees from said distal end toward the proximal end.

9 Claims, 10 Drawing Sheets

FIG.12

FRICTIONALLY DRIVEN ROLLER TYPE TRANSFER APPARATUS

BACKGROUND OF INVENTION

1. Field of Invention

This invention relates to improvements in frictionally driven roller type transfer apparatus in which a pallet is stationary when the crossing angle between the axes of rotation of a driven roller and a driving shaft is zero, and the pallet may be driven when the angle is greater than zero.

2. Description of Prior Art

Conventionally, air cylinder type driving is utilized for moving a pallet to and fro, which has a drawback that its stroke is short and speed adjustment is difficult.

In Japanese Patent Laid-open Application No. 81562/1985, a pallet transfer apparatus is disclosed, which is, in the similar manner as the present invention, frictionally driven by a roller which is pressed against a driving shaft with a crossing angle between the axes of rotation. The one-way driving shaft in this case extends in the direction of the travel of the pallet. However, this prior art device is an automatic-turn type; and accordingly, a pallet cannot stop stably; and the accuracy of the stop position is rather poor. One way for solving this problem is to provide separate driving shafts for driving a pallet to and fro respectively; but such an alteration would render the whole structure of the transfer apparatus much complicated. Moreover, in prior art devices of this sort, it has not been possible to stop a pallet at intermediate positions.

In the next place, in a gyratory mechanism of the driven roller mounted in a pallet transfer apparatus of this sort, it has been conventional to dispose a coil spring for the purpose of urging the driven roller, which is frictioanlly driven by the peripheral surface of the driving shaft, to its zero position. However, in a case where the driven roller is urged to its zero position by means of such a coil spring, the zero position which should represent the stationary condition of the pallet is likely to become unstable; and accuracy of the stop position cannot be good.

SUMMARY OF INVENTION

The first object of this invention is to provide, by eliminating the above-mentioned drawbacks, a stop-start apparatus of a transfer apparatus which is capable of stopping and starting with a predetermined rate as well as controlling the speed at the time of the stop/-start motion as desired.

Another object of this invention is to provide an intermediate position stop-start apparatus which is capable of conveying a pallet to and fro by use of a single one-way driving shaft, stopping at predetermined intermediate positions, restarting in either directions, passing the predetermined intermediate stop positions as desired, as well as controlling the speed at the time of stop/start motion.

Still another object of the present invention is to provide a gyratory mechanism of a driven roller which is capable of adjusting the contact pressure of the driven roller with the driving shaft to be proportionate to the degree of the crossing angle between the driven roller and the driving shaft, and having a stable stop condition.

Thus, the present invention is, firstly, in a transfer apparatus in which a pallet is stationary when the crossing angle between the axes of rotation of a driven roller and a driving shaft is zero, and the pallet may be driven when the angle is greater than zero, a stop-start apparatus comprising a cam follower roller supported by a support member of said driven roller, a stopper block guided and supported at a stop position of the pallet so as to move to and fro in the directions of the transfer and having a notch into which said cam follower roller fits so as to keep said angle zero, a cam the proximal end of which is pivotally supported in advance of said stop position having a cam surface on which said cam follower roller makes a rolling contact, a spring urging said cam to a predetermined position, the distal end of said cam, in said predetermined position, being near said notch and said cam being so shaped as to increase said angle from zero to 45 degrees from said distal end toward the proximal end.

The present invention is, secondly, in a transfer apparatus of the sort mentioned above, an intermediate position stop-start apparatus comprising a cam follower roller supported by a support member of said driven roller, a stopper block guided and supported at a stop position of the pallet so as to move to and fro in the directions of the transfer and having a notch into which said cam follower roller fits so as to keep said angle zero, a pair of cams the proximal ends of which are pivotally supported at a respective forward and backward positions of said stop position having respective cam surfaces on which said cam follower roller makes a rolling contact, springs urging said cams to the respective predetermined positions, the distal ends of said cams, in said respective predetermined positions, being near said notch and said cams being so shaped as to increase said angle from zero to 45 degrees from said respective distal ends toward the proximal ends.

The cam follower roller contacts under pressure the cam rail extending in the direction of transfer and the crossing angle between the axes of rotation of the driven roller and the driving shaft may be maintained at 45 degrees in either direction; and accordingly, the driven roller may be driven at the maximum speed causing the pallet to be conveyed either forward or backward depending upon the orientation of the driven roller. As the pallet approaches the stop positions at both ends of travel or the intermediate stop positions and the cam follower roller gets on the cam surface leaving the cam rail, assuming that the cam is not aligned with the cam rail, the crossing angle will gradually decrease to zero; as a result, the component of the driving force in the direction of transfer will decrease causing the speed of the pallet also to decrease. When the pallet reaches the stop position, the cam follower roller fits into the notch in the stopper block; the crossing angle and the driving force become nil; thus the pallet becomes stationary and positioned with the notch as a stopper.

In order to restart the pallet, the stopper block is moved in the desired direction of the restart. Then, the cam follower roller is caused to move forward being pushed by the notch in the stopper block; and the crossing angle becomes greater than zero. Thus, the driven roller restarts the pallet being driven by the driving shaft. Thereafter, the angle gradually increases and approaches 45 degrees by the action of the cam surface; and the pallet will be accelerated as the driving force increases; and the cam follower roller will get out of the notch. The cam follower roller will be transferred to the cam rail as it passes the cam, the angle reaching 45 degrees.

In case an intermediate stop-start apparatus is provided, and if it is desired to let the pallet pass it without stopping, two cams are pushed out by means of pushing means (e.g., air cylinders) so that the cam surfaces are aligned. Then, the cam follower roller will simply pass the two cam surfaces without fitting into the notch with the angle being maintained at 45 degrees.

The stopper block may preferably be provided with a roller which may cause the cam to be pushed out sidewardly as the block is moved, thus causing the crossing angle to increase rapidly to 45 degrees. By so doing, the pallet may be accelerated attaining the full speed quickly.

Moreover, it is possible to decrease the degree of inclination of the cam surfaces by means of separate pushing means other than said roller, thereby accelerating the pallet; and such pushing means may be utilized to move the two cam surfaces so that they are aligned to let the pallet pass the intermediate stop positions.

The present invention is, thirdly, in a transfer apparatus of the above-mentioned sort, a gyratory mechanism for a driven roller comprising a hollow support shaft for rotatably receiving a gyratory shaft of the driven roller, said gyratory shaft being connected to a support member of the driven roller, a cam member spline fit with said hollow support shaft, a cam follower member mounted to said gyratory shaft of the driven roller and cooperating with said cam member, and a spring urging said cam member toward the cam follower member, said cam member and cam follower member urging said gyratory shaft of the driven roller to the position where the crossing angle is zero by means of said spring.

In such a gyratory mechanism, if the axis of rotation of the driven shaft is parallel to the driving shaft, the driven roller is simply rotated by the driving shaft with no driving force transmitted to the pallet. If the gyratory shaft of the driven roller is gyrated by an external force, the axis of rotation of the driven shaft will cross the axis of rotation of the driving shaft; and at the same time, the spring urges the cam member as well as the cam follower member; the contact pressure between the driven roller and the driving shaft increases as result of the reaction thereof, thereby causing the frictional driving force in proportion to the degree of the crossing angle. Thereafter, the cam follower roller continues to give a constant frictional driving force to the pallet, maintaining the crossing angle by the action of the cam rail.

As the crossing angle decreases when the driven roller leaves the cam rail and gets in contact with the cam surface, the cam member which is urged by the spring will be subjected to the force tending to cause the driven roller to move to its zero position; namely, the position in which said crossing angle is zero. As result, the axes of rotation of the driven roller and the driving shaft will become parallel; and consequently, the pallet will stop as the driving force is reduced to zero.

The cam follower member in contact with the cam member will cause the urging force toward the cam member to become greater according to the degree of the crossing angle by virtue of the configuration of its cam surface, thus increasing the contact pressure between the driven roller and the driving shaft, imparting a quickly rising frictional driving force to the pallet.

EMBODIMENTS

Figure 1:
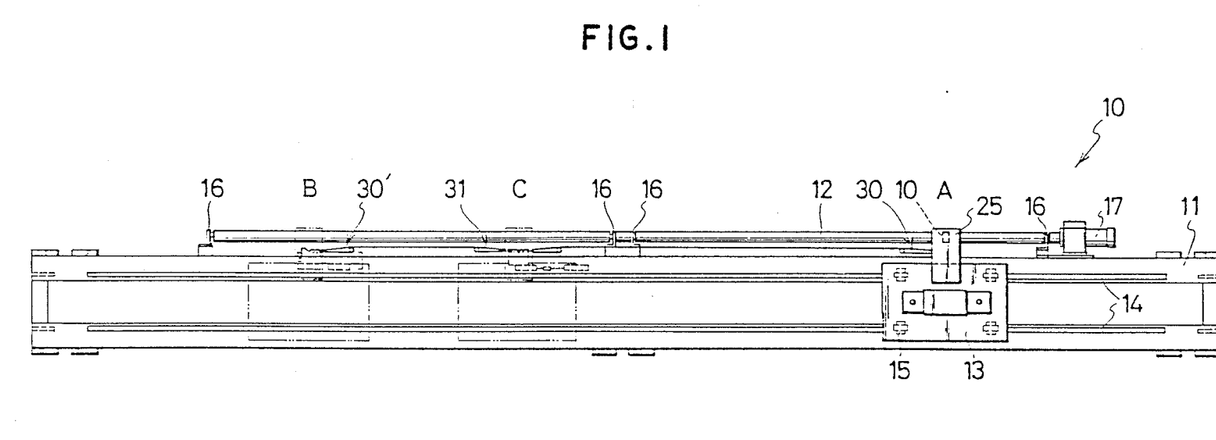
FIG. 1 is a plan view of the transfer apparatus of this invention in which two stop positions at both ends as well as an intermediate stop position are illustrated.

FIG. 1 is a plan view of the transfer apparatus of this invention. A pallet 13 can move to and fro by means of rollers 15 guided by rails 14, 14. At the side of a frame 11, a rotary driving shaft 12 is supported by bearings 16 and is driven in one direction as indicated by arrow by a motor 17.

Figure 2:
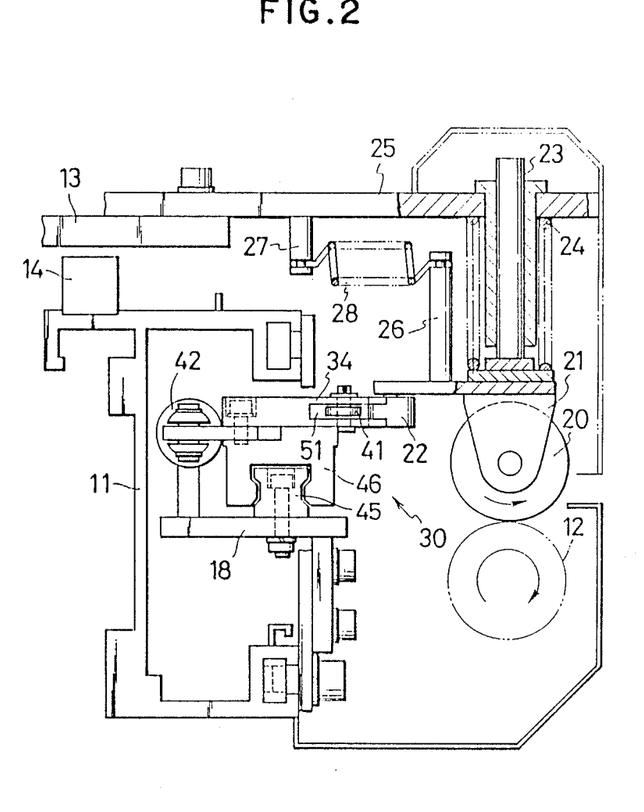
FIG. 2 is a partly sectioned side view of an stop-start apparatus positioned at one end.

As shown in FIG. 2, under an arm 25 which projects from the pallet, a driven roller 20 is supported such that it can gyrate about a vertical shaft 23, and is pressed by means of a spring 24 against the driving shaft 12. Thus, if the crossing angle α (see FIG. 3) between the axes of rotation of the driven roller and the driving shaft is zero, the driven roller 20 will be rotated in vain, the pallet without being conveyed; and if the crossing angle is 45 degrees, the pallet 13 will be conveyed as the driven roller 20 is frictionally driven with the maximum driving force. Namely, the pallet 13 will be conveyed only when the axes of rotation cross with each other. Therefore, it will be appreciated that the pallet may be turned by providing the crossing angle changing devices as stop-start apparatuses 30, 30' at the respective end points A and B of the travelling path.

Figure 3:
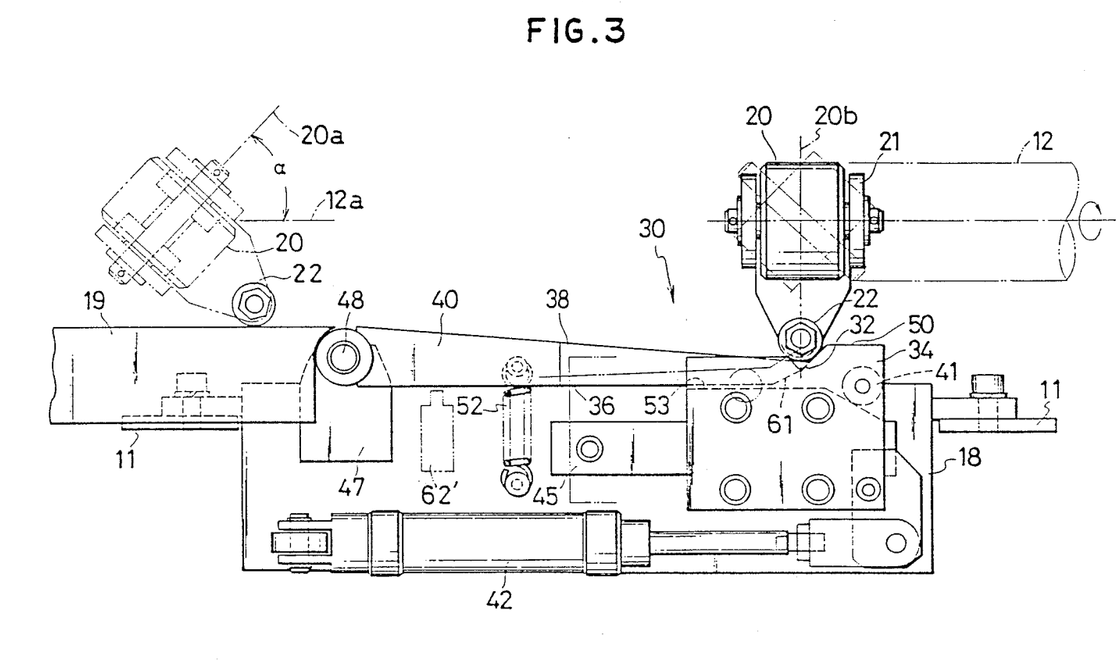
FIG. 3 is an enlarged plan view of the stop-start apparatus of FIG. 2.
Figure 4:
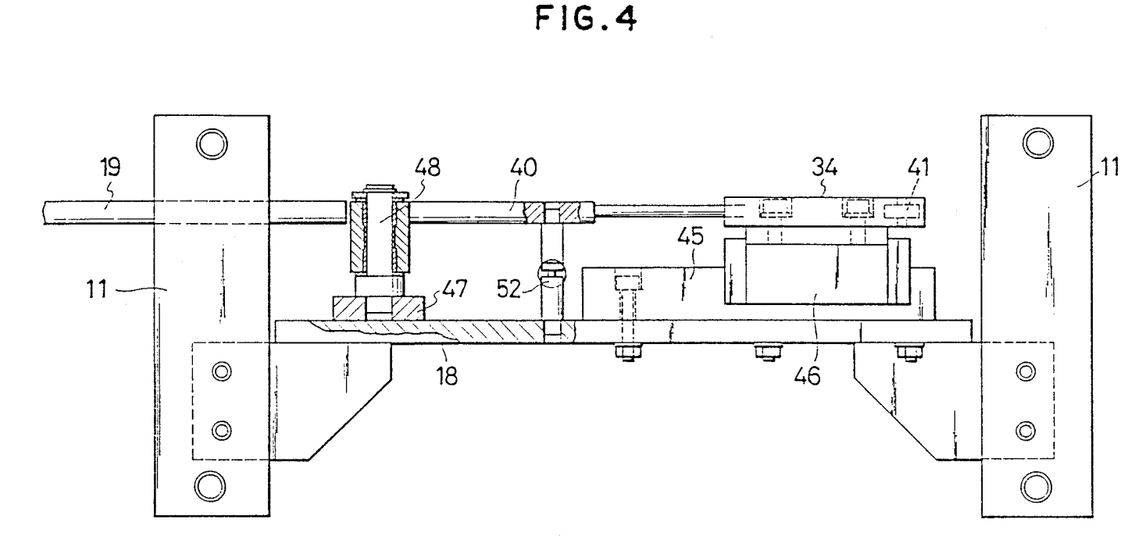
FIG. 4 is a front view of FIG. 3.

FIGS. 2 to 4 show details of a stop-start apparatus 30 provided at one end. As shown in FIG. 2, a support member 21 of the driven roller 20 is secured to the vertical shaft 23 and is supported in the vertical center line of the driven roller 20 such that it can move up and down as well as gyrate horizontally relative to the arm 25. Thus, the driven roller 20 may be pressed against the driving shaft 12 by means of the spring 24. A coil spring 28 is disposed between a rod 26 fixed to the support member 21 and a rod 27 fixed to the arm 25, which spring 28 urges so that the axis of rotation (20a) of the driven roller 20 may become parallel to the axis of rotation (12a) of the driving shaft 12 or so that the crossing angle α becomes zero. See FIGS. 2 and 3. On the support member 21, a cam follower roller 22 is rotatably supported in a center plane 20b which evenly divides the driven roller 20 perpendicular to its axis of rotation at the side of the pallet 13 as viewed from the driven roller 20.

All of the component parts of a stop-start apparatus 30 provided at the stop position A are mounted on a base 18 fixed on the frame 11. Reference numeral 45 denotes a fixed guide rail arranged along the line of the travel; and a saddle member 46 can move to and fro being guided by rolling contact elements (not shown) by means of an air cylinder 42 one end of which is pivotally supported by the base 18. As shown in FIG. 3, a stopper block 34 is fixed to the saddle member 46; and a notch 32 is provided at a side of the block facing the driven roller 20 into which the cam follower roller 22 fits when the crossing angle is reduced to zero. The notch 32 is substantially V-shaped, the inclined surface opposing another inclined surface at the end side of travel being relatively short. As will be appreciated, when the cam follower roller 22 fits into the notch 32, the driven roller 20 is rotated in vain by the driving shaft 12 (as illustrated by solid line in FIG. 3); and the pallet 13 stops.

A vertical pin 48 is fixed to a base plate 47 which is provided in a forward position of travel on the base 18. The proximal end of the cam 40 is pivotally supported by the pin 48. The distal end of the cam 40 is tapered and is within the channel 51 provided at a side 50 of the stopper block 34 (see FIG. 2), and is stationary with the inner surface 36 of the cam being parallel to the bottom 53 of the channel 51 by means of a spring 52 as well as s stopper (not shown). In this stationary position, the distal end of the cam 40 is near the notch 32. The cam 40 is tapered from the proximal end toward the distal end; and at the distal end, the cam surface 38 is almost in contact with the cam follower roller 22 which is located in the notch 32 as shown by solid line in FIG. 3. The cam surface 38 of the proximal end of the cam 40 smoothly continues to the cam rail 19.

Another stop-start apparatus 30' at the other end B is symmetrically structured as the stop-start apparatus 30.

Figure 5:
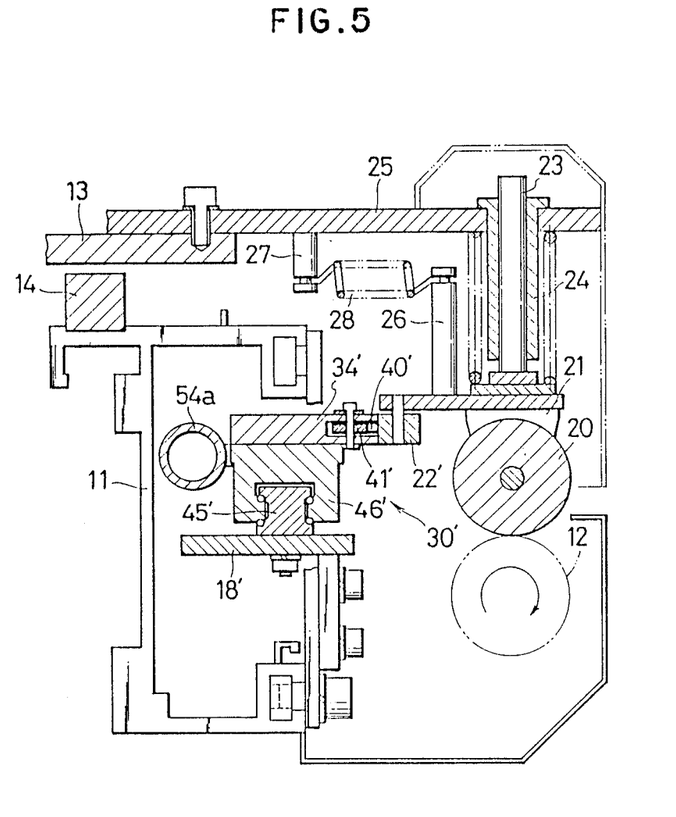
FIG. 5 is a sectioned side view of an intermediate stop-start apparatus taken at line 5—5 in FIG. 6.
Figure 6:
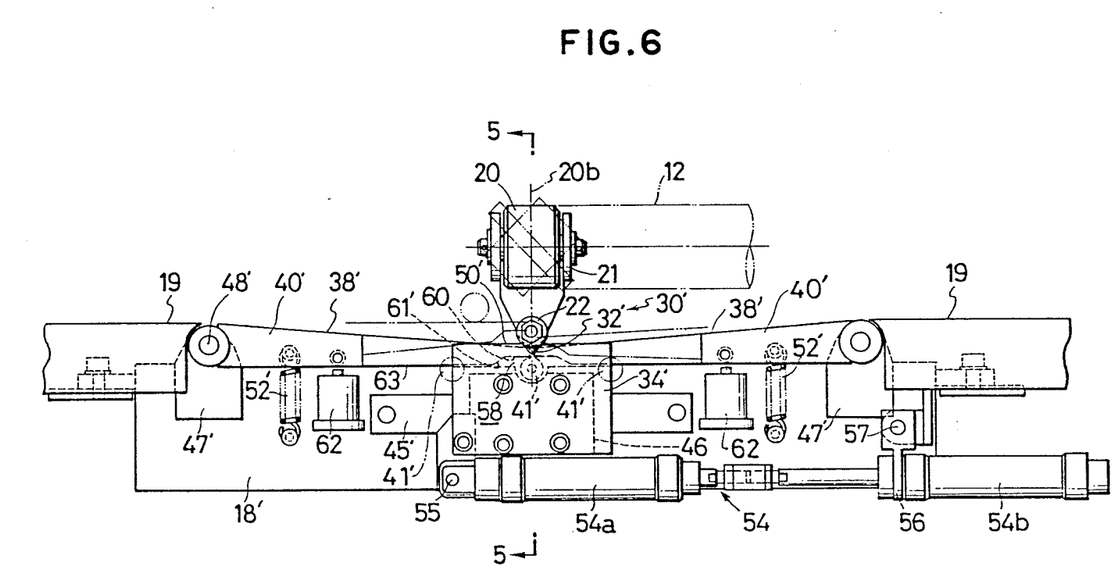
FIG. 6 is an enlarged plan view of FIG. 5.
Figure 7:
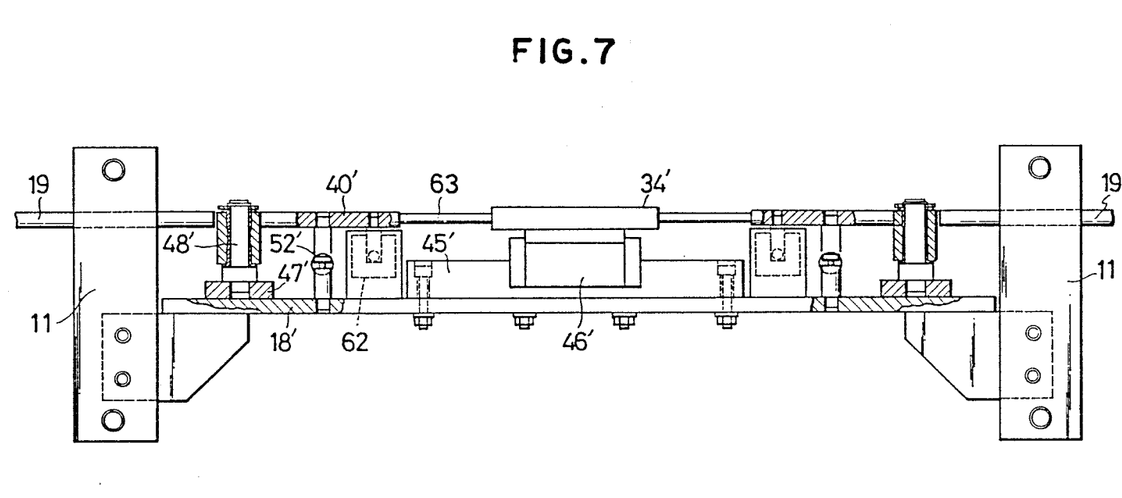
FIG. 7 is a front view of FIG. 6.

An intermediate stop-start apparatus 31 is provided at an intermediate stop point C, the details of which are shown in FIGS. 5 to 7.

As illustrated in FIGS. 5 and 6, all of the component parts of the intermediate stop-start apparatus 31 are also mounted on the base 18' fixed to the frame 11. A saddle member 46' which is guided by a fixed guide rail 45' with rolling contact elements therebetween may be actuated to and fro by means of a double stroke air cylinder 54 which comprises two serially connected air cylinders 54a and 54b. Namely, one end of the air cylinder 54a is pivotally connected by a pin 55 to the saddle member 46'; and a metal fitting 56 secured to the air cylinder 54b is pivotally connected to the base 18'. The air cylinders 54a and 54b cause the saddle member 46' to be moved with respect to the left half and right half of the guide rail 45', respectively.

As shown in FIG. 6, the stopper block 34' is fixed on the saddle member 46'; and, at the center of one side of the stopper block 34' facing the cam follower roller 20, a V-shaped notch 32' is provided, in which the cam follower roller 22 fits when the crossing angle α is zero. Vertical pins 48', 48' are provided on base plates 47', 47' disposed on the base 18', and respective proximal ends of a pair of cams 38', 38' are pivotally supported thereon. Each cam 40' tapers off toward the distal end, which enters the channel 51' formed in the side 50' of the stopper block 34'; and is stationary at the position shown in FIG. 6 by means of springs 52', 52' and stoppers (not shown). The central portion of the channel 51' is deepened semi-circularly and a roller 41' is supported therein. In the position illustrated by solid line in FIG. 6, the distal ends of the cams 40', 40' oppose each other in the notch 32' with a small gap therebetween and the roller 41' is in contact with the smooth surface 60 formed in the recessed portion 58 behind the respective ends of the cams 40', 40'. At the ends of the smooth surfaces 60, 60, inclined surfaces 61', 61' are formed. As mentioned before, the cams 40', 40' taper off toward the respective distal ends, and in said stationary position, the proximal ends of the cams 40', 40' continue to the cam rails 19, 19; and the cam surfaces incline interiorly toward the respective distal ends; and the end portions are almost in contact with the cam follower roller 22 which is held by the notch 32' (see the position shown by solid line in FIG. 6.)

On the base 18', a pair of air cylinders 62, 62 are provided for pushing the cams 40', 40' outwardly against the urging force of the springs 52', 52'.

Hereafter, operation will be explained.

Initially, assume a pallet 13 is at the stop position A shown in FIG. 1; the air cylinder 42 has extended; the stopper block 34 is in the position shown by solid line in FIG. 3; and the cam follower roller 22 is held in the notch 32. Then, assume the air cylinder 42 contracts, causing the stopper block 34 to move leftwardly in FIG. 3. The cam follower roller 22, being pushed by the notch 32, starts to roll on the cam surface 38; at the same time, the support member 21 is caused to gyrate clockwise in FIG. 3. Consequently, the crossing angle between the axes of rotation of the driven roller 20 and the driving shaft 12 increases from zero; and the driven roller 20, being frictionally driven by the rotation of the driving shaft in the direction shown by arrow, causes the pallet 13 to move leftwardly. As the cam follower roller 22 rolls on the cam surface 38, it gets out of the notch 32, and when the stopper block 34 reaches the position indicated by the dot-dash line at the stroke end of the air cylinder 42, the roller 22 completely escapes from the notch 32 and the crossing angle increases more with the resulting greater frictional driving force. And, when the roller 22 has just passed the cam surface 38, the crossing angle attains 45 degrees; and thereafter, the pallet 13 may be conveyed in the left direction at the maximum speed, maintaining the crossing angle at 45 degrees by the cam rail 19.

In addition, if desired, a modification, as hereinafter described, may be employed in order to more quickly start a pallet 13. Namely, in FIG. 3, the end portion of the bottom 53 of the channel 51 is made deeper by inclination and a roller 41 is supported adjacent thereto. And an inclined surface 61 is formed at the inner end portion of the cam 40. Assume the stopper block 34 is moved leftwardly in FIG. 3. The cam follower roller 22, as mentioned before, advances along the cam rail 19 ahead of the driven roller 20. When the roller 41 comes in contact with the inclined surface 61, the cam 40 will be pushed outwardly, causing the cam surface 38 to push the cam follower roller 22 additionally outwardly. Consequently, the pallet may be accelerated.

When the pallet 13 heads for the intermediate position C, if the stopper block 34' is in the center, the cam surfaces 38', 38' are inclined from the proximal end toward the distal end. Consequently, as the follower roller 22 transfers from the cam rail 19 to one of the cam surfaces 38', the driven roller will gyrate to gradually decrease the crossing angle with the resulting lesser driving force. And when the cam follower roller 22 fits into the notch 32', the pallet stops as the crossing angle is reduced to zero.

In order to restart the pallet 13 in either directions, it is necessary to move the stopper block 34' by means of the air cylinder 54a or 54b in the direction of the restart. As was the case with the above-mentioned embodiment, the cam follower roller 22 gets on one of the cam surface 38' being pushed by the notch 32'; and as the crossing angle increases from zero, the driven roller 20 may be driven by the driving shaft 12 rotating in the direction indicated by arrow. Consequently, the pallet 13 may be conveyed in the desired direction. And, when the roller 41' pushes out the inner side face 63 of the cam 40' after passing the inclination 61', the crossing angle quickly increases with the resulting greater driving force. When the cam follower roller 22 transfers from the cam 40' to the cam rail 19, the crossing angle is 45 degrees and the pallet may be conveyed at the maximum speed. Thereafter, the stopper block 34' is returned to the neutral position.

In addition, when the pallet 13 is restarted from the stop position C in either directions, the pallet may be accelerated if the inclination of the cam surface 38' is decreased by pushing out the cam 40' by means of the air cylinder 62 (i.e., pushing means). It will be understood that a similar cylinder 62' may be provided in the embodiment of FIG. 3.

The air cylinders 62, 62 may also be used to bring the two cam surfaces 38', 38' of the cams 40', 40' into alignment; then, the pallet 13 simply passes the point C without stopping.

As is evident from the foregoing description, when the driving shaft 12 rotates in the direction indicated by arrow, the cam follower roller 22 is always located in front of the driven roller 20 in the direction of the travel. Consequently, the condition of the driven roller 20 as it is near the stop-start apparatus 30' located at the opposite end will be as indicated by the two-dot dash line in the right in FIG. 3, which is just symmetrical with the condition where the pallet approaches the stop-start apparatus 30 in FIG. 3 as shown by the two-dot dash line in the left.

When the pallet 13 comes near the stop-start apparatus 30, the stopper block 34 as well as the cam 40 are in the position as indicated by the solid line in FIG. 3, and as the cam follower roller 22 trasfers from the cam rail 19 to the cam surface 38, the crossing angle will become smaller than 45 degrees by the operation of the spring 28 with the resulting lesser driving force. And when the cam follower roller fits into the notch 32, the pallet 13 stops at the predetermined position with the notch 32 as a stopper.

In the manner as explained above, the pallet 13 may be conveyed to and fro between the stop positions A and B. Moreover, the intermediate stop-start apparatus 31 enables the pallet 13 to stop at it; or pass it; or restart in the reverse direction.

By virtue of the above-mentioned structure, the driving motor 17 of the driving shaft 12 may be rotated simply in one direction without need for the reverse rotation, or braking of the motor 17, which can contribute to the simplification of the control circuit.

Moreover, possible shocks at the time of stoppage or restart may be supressed, since the crossing angle may be increased or decreased from zero to 45 degrees or vice versa gradually by the cam surfaces. The inclination of the cam surfaces may be decided to obtain the desired acceleration or deceleration.

In addition, acceleration at the time of restart may be controlled with ease by means of separate means. Thus, the articles on the pallet may be prevented from tumbling down; or the pallet may be conveyed more quickly, which can afford longer time for working on the workpieces on the pallet while the pallet is stationary.

Furthermore, the intermediate stop-start apparatus 31 makes it possible to stop, pass or restart after stop a pallet 13 in either directions at intermediate positions utilizing a driving shaft which is rotated in one direction.

In the last place, the gyrating mechanism of the driven roller according to the present invention will be explained hereinbelow.

Figure 8:
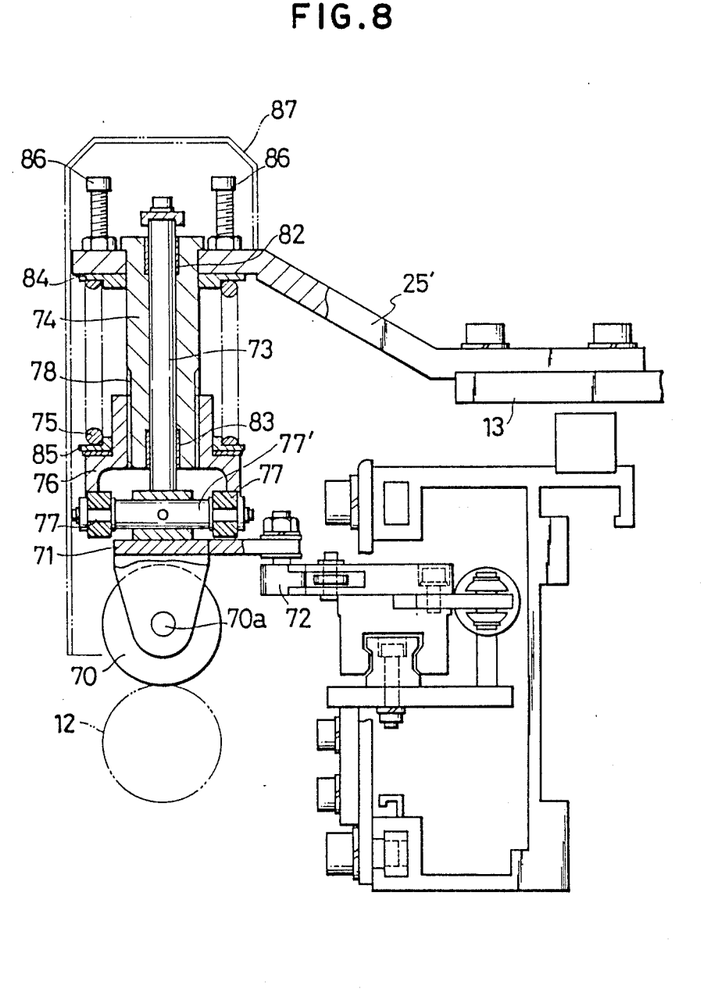
FIG. 8 is a sectional side view of a gyratory mechanism of a driven roller and is a section at line 8—8 in FIG. 9.
Figure 9:
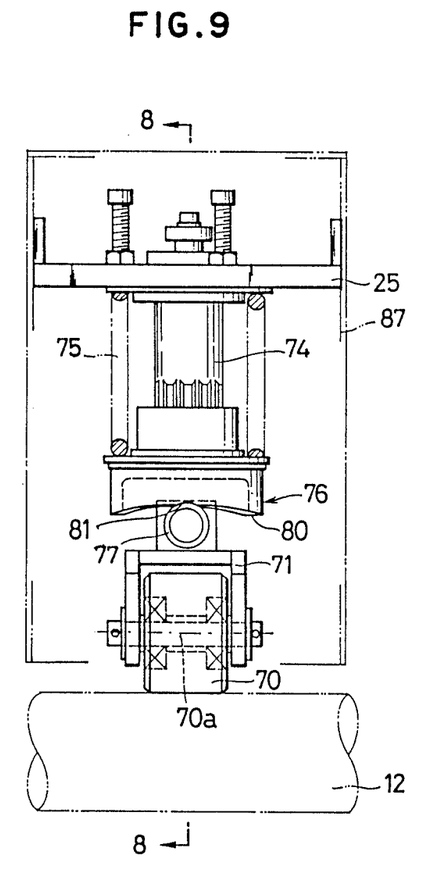
FIG. 9 is a front view of a gyratory mechanism of a driven roller.
Figure 10:
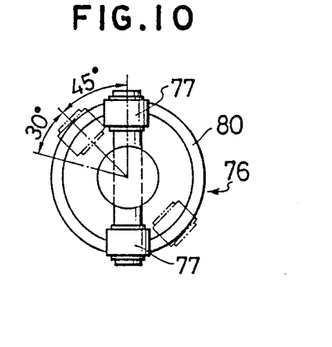
FIG. 10 is a bottom view showing the operational range of a cam member and a cam follower member.

FIGS. 8 to 10 show the details of the gyratory mechanism of this invention. To the arm 25' of the pallet 13 secured is a hollow support shaft 74 having an outer spline 78 which is orientated toward the driving shaft 12. An annular cam member 76 is spline fit with the hollow shaft 74 such that it can move in the axial direction of the shaft 74. A support member 71 supports a driven roller 70 as well as the cam follower roller 72. A driven roller gyratory shaft 73 to which is connected a shaft 77' of the two cam follower members 77, 77 is inserted into the hollow shaft 74 with two bushings 82, 82 arranged at the both ends. The cam follower members 77, 77 cooperate with the rolling surface 80 which is formed on the lower surface of the cam member 76 facing downwardly.

Between the lower surface of the arm 25' and the cam member 76, a coil spring 75 is disposed with washers 84, 85 arranged at both ends. The spring 75 urges the cam member 76, which in turn urges the cam follower member 77 through the rolling surface 80. Thus, the driven roller 70 may be pressed against the driving shaft 12. Adjusting bolts 86 enables adjustment of the contact pressure between the cam member 76 and the cam follower member 77 by moving the upper washer 84 up or down. A transparent cover 87 envelopes the mechanism for dust prevention.

Figure 11:
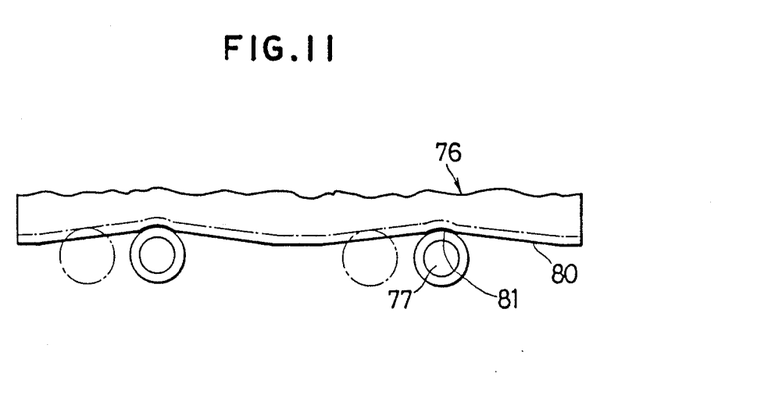
FIG. 11 is a developed view of the cam member.
Figure 12:
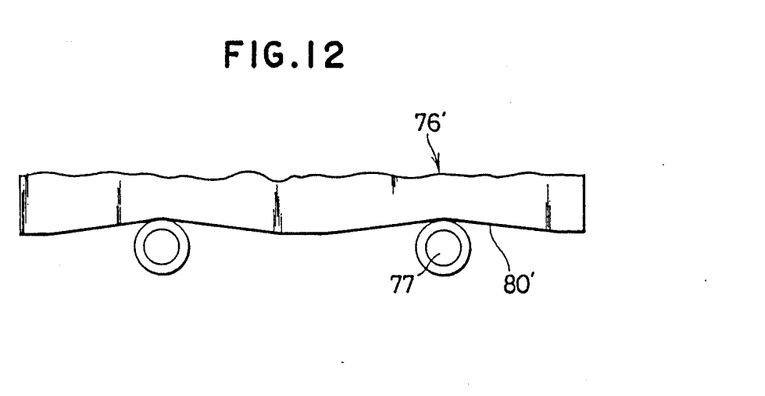
FIG. 12 is a developed view of another cam member.

The cam rolling surface 80 is symmetrical with respect to a plane which includes the axis of rotation of the cam member 76 such that the urging force increases as the crossing angle increases; and a notch 81 having the same radius of curvature as that of the cam follower member 76 is formed at the position corresponding to the zero position of the driven roller 70. The rolling surface 80, when developed, is shaped as illustrated in FIG. 11; namely, it is inclined in the direction of gyration starting from the notch 81 so that the urging force becomes greater as the angle of gyration increases. It will be appreciated that a cam member 76' having a simply inclined rolling surface 80' as shown in FIG. 12 will similarly function. Furthermore, two cam follower members 77, 77 are not necessarily required; only one member could function as well.

FIGS. 8 and 9 correspond to the stationary condition of the transfer apparatus 10. Assume the cam follower roller 72 is actuated so that the crossing angle becomes greater than zero by means of the above-mentioned stop-start apparatus. The axis of rotation 70a of the driven roller 70 secured to the support member 71 will be caused to gyrate such that it crosses that of the driving shaft 12. Simultaneously, the cam follower member 77, getting out of the notch 81 of the rolling surface 80, pushes upward the cam member 76 along the spline 78 of the hollow shaft 74 and gyrates, pressing the spring 75 in the reverse direction. The reaction of said pressing is transmitted to the driven roller 70, so that a greater frictional driving force may be imparted to the pallet 13. The angle of gyration of the cam follower member 77 given by a starting apparatus through the cam follower roller 72 is indicated with respect to one direction by solid line and two-dot dash line in FIG. 10; namely, the angle of gyration is 45 degrees in both directions from the zero position. It is to be noted that the rolling surface 80 is formed 30 degrees in addition to said 45 degrees. As the crossing angle increases, a greater contact pressure between the driving shaft 12 and the driven roller 70 may be generated as compared with the zero position by the operation of the cam member 76, cam follower member 77 and the spring 75. Consequently, a quickly rising starting force may be obtained. The spring 75 will urge the cam follower member 77 to return to the zero position through the rolling surface 80. However, as mentioned before, the position of the cam follower member 72 may be maintained by the cam rail 19; and the pallet may be conveyed until it reaches the next stop position.

Next, assume the pallet 13 comes closer to the stop position C from the intermediate stop position C. As the cam follower roller 72 moves along the cam surface 38, the crossing angle reduces gradually. Consequently, the cam follower member 77 will gradually gyrate along the rolling surface 80 to return to the notch 81. As a result, the driven roller 70 returns to the zero position, and the pallet 13 stops as the crossing angle is reduced to zero.

The above-described structure enables the pallet to be conveyed to and fro on the same rail 14, 14, since the driven roller 70 may be gyrated in both directions. The spring 28 as shown in FIG. 2 may be done away with. The seating of the cam follower member 77 in the notch 81 renders the stop position accurate. Moreover, the fact that the contact pressure of the driven shaft 70 when it is stationary is relatively low, leads to a longer life of use thereof. And, when it is put in the condition of starting, the contact pressure may positively increase, which may impart a quickly rising starting force to the pallet.

What is claimed is:

1. In a transfer apparatus having a driving shaft, means to guide a pallet along a travel path parallel to said shaft, and a driven roller supported by a member on said pallet to engage said driving shaft, in which the pallet is stationary when the crossing angle between the axes of rotation of the driven roller and the driving shaft is zero, and the pallet may be driven when the angle is greater than zero, a stop-start apparatus comprising:
    a cam rail extending generally parallel to said travel path;
    a cam follower on the support member of said driven roller to engage said cam rail and angularly position the axis of said driven roller;
    a stopper block in said cam rail guided and supported at a stop position of the pallet in its travel path so as to move in the directions of the pallet's travel and having a notch into which said cam follower fits so as to keep said crossing angle zero;
    a movable cam having a proximal end pivotally supported in advance of said stop position, and having a cam surface on which said cam follower makes contact; and
    a spring urging said cam to a predetermined position;
    said movable cam having a distal end in said predetermined position near said notch, and said cam surface being so shaped as to increase said crossing angle from zero to 45 degrees as said follower travels from said distal end toward the proximal end.

2. The apparatus according to claim 1 including means to displace said stopper block longitudinally of said travel path to displace said cam follower and make said crossing angle greater than zero.

3. The apparatus according to claim 2 in which said cam distal end is movable transversely of said path, and wherein said stopper block has a roller, said roller being adapted to push said cam distal end outwardly away from said predetermined position as the stopper block is moved.

4. The apparatus according to claim 1 further comprising a pushing means for displacing said cam surface outwardly into alignment with said cam rail.

5. In a transfer apparatus having a driving shaft, means to guide a pallet along a travel path parallel to said shaft, and a driven roller supported by a member on said pallet to engage said driving shaft, in which the pallet is stationary when the crossing angle between the axes of rotation of the driven roller and the driving shaft is zero, and the pallet may be driven when the angle is greater than zero, an intermediate postion stop-start apparatus comprising:
    a cam rail extending generally parallel to said driving shaft;
    a cam follower on the support member of said driven roller to engage the cam rail and angularly position the axis of said driven roller;
    a stopper block in said cam rail guided and supported at a stop position of the pallet so as to move in the directions of the pallet's travel and having a notch into which said cam follower roller fits so as to keep said angle zero;
    a pair of movable cams in said cam rail having respective proximal ends pivotally supported at each side of said stop position, and having cam surfaces on which said cam follower makes contact; and
    springs urging said cams to respective predetermined positions;
    said movable cams having respective distal ends in said respective predetermined positions near said notch, and said cam surfaces being so shaped as to increase said angle of the driven roller from zero to 45 degrees as the follower travels from said respective distal ends toward the proximal ends.

6. The apparatus according to claim 5 in which said stopper block has a roller, said roller being adapted to push said respective cam surface outwardly away from its predetermined position as the stopper block is moved relative to the cam on one side of said stop position.

7. The apparatus according to claim 5 further comprising a pushing means for displacing said cam surface into alignment with said cam rail.

8. In a transfer apparatus having a driving shaft, means to guide a pallet along a travel path parallel to said shaft, and a driven roller supported by a member on said pallet to engage said driving shaft, in which the pallet is stationary when the crossing angle between the axes of rotation of the driven roller and the driving shaft is zero, and the pallet may be driven when the angle is greater than zero, a gyratory mechanism for the driven roller comprising:
    a gyratory shaft connected to a support member of the driven roller;
    a hollow support shaft for rotatably receiving said gyratory shaft;

a cam member spline fit with said hollow support shaft;

a cam follower member mounted to said gyratory shaft of the driven roller and cooperating with said cam member; and a spring urging said cam member toward the cam follower member;

said spring through said cam member and cam follower member urging said gyratory shaft of the driven roller to the position where said angle is zero.

9. The gyratory mechanism according to claim 8 in which said cam member is formed with a notch into which said cam follower member fits when said driven roller axis angle is zero.

* * * * *